United States Patent [19]

Saunders

[11] Patent Number: 5,627,801
[45] Date of Patent: May 6, 1997

[54] UNDERWATER PINGER ACOUSTIC RESONANCE CHAMBER

[76] Inventor: David N. Saunders, 82 Industrial Park Dr., Saco, Me. 04072

[21] Appl. No.: 504,594

[22] Filed: Jul. 20, 1995

[51] Int. Cl.$^6$ .................................................. G10K 9/12
[52] U.S. Cl. ............................................................ 367/139
[58] Field of Search ................................. 367/139, 162, 367/176; 43/17.1

[56] References Cited

U.S. PATENT DOCUMENTS

| | | | |
|---|---|---|---|
| 3,872,421 | 3/1975 | Rogers et al. | 367/162 |
| 4,646,276 | 2/1987 | Kowalewski et al. | 367/139 |
| 4,805,339 | 2/1989 | Fuentes | 43/17.1 |
| 5,291,682 | 3/1994 | Zaccheo | 367/139 |

*Primary Examiner*—Daniel T. Pihulic
*Attorney, Agent, or Firm*—Chris A. Caseiro; Thomas L. Bohan

[57] ABSTRACT

An acoustic resonance chamber in an underwater pinger is designed to enhance the acoustic emission from the pinger. An electro-acoustic transducer of the pinger is positioned away from a reflective surface of the pinger housing by a distance chosen in proportion to the wavelength of the fundamental frequency of the acoustic emission. This creates a resonant condition at the transducer, maximizing the acoustic output. This design also causes a maximum transfer of the acoustic wave through the pinger housing and into the surrounding water.

16 Claims, 6 Drawing Sheets

Fig. 3a
Direct Acoustic Wave

Fig. 3b
Reflected Acoustic Wave

Fig. 4a
Direct Acoustic Wave
L = ½ Wavelength

Fig. 4b
Reflected Acoustic Wave
L = ½ Wavelength

Fig. 5a
Direct Acoustic Wave
L = 1 Wavelength

Fig. 5b
Reflected Acoustic Wave
L = 1 Wavelength

Fig. 6

UNDERWATER PINGER ACOUSTIC RESONANCE CHAMBER

BACKGROUND OF THE INVENTION

1. Technical Field

The present invention relates to means for alerting certain fish and marine mammals that an underwater structure is nearby. More particularly, the present invention relates to "pingers" that transmit acoustic signals in a frequency range corresponding to the hearing capability of the species of interest. Still more particularly, the present invention relates to the watertight housing used to retain an electro-acoustic transducer. The housing is designed to provide sufficient acoustic output while minimizing power usage.

2. Description of the Prior Art

Widely used commercial fishing techniques involve the distribution of nets underwater which entangle targeted fish species for harvest. An unwanted result is that non-targeted fish and mammals may also become entangled in the nets. These "bycatch" species have an associated mortality which is desired to be minimized. Marine mammals in particular have shown the ability to avoid fishing nets if they are made aware of the nets. One means to alert the mammals to the presence of the net is the use of acoustic pingers along the length of the net. The characteristics of the pinger acoustic emissions are chosen so that the marine mammals are alerted, but the targeted fish species are not. It has been found that most commercially targeted fish have a hearing range that extends to no more than one or two kilohertz. Marine mammals have hearing ranges that extend up to several tens of kilohertz. Therefore pingers with acoustic outputs in the frequency range of a few kilohertz to several tens of kilohertz can perform the desired function of alerting the marine mammals to the presence of the fishing gear.

A pinger is basically a battery-powered acoustic transmitter which is attached to underwater fishing nets. The pinger emits acoustic waves which alert marine mammals to the presence of the net. This invention relates to the construction of the pinger to maximize the amplitude of the acoustic emission into the water. The pinger is enclosed in a watertight housing. A battery provides power to an electronic oscillator. The oscillator drives an electro-acoustic transducer which produces sound emissions. These sound emissions travel from the electro-acoustic transducer, through the medium inside the pinger (air), through the watertight housing and into the water.

Standard practice has been to use a watertight housing of minimum dimensions to contain the pinger components (battery, oscillator, and transducer). This results in minimized cost of the housing. However it may not provide maximum acoustic output per unit of battery power (or equivalently maximum battery lifetime at a given acoustic output level). Experimental pingers made using this construction have demonstrated operational battery lifetimes on the order of two weeks. This is not sufficient for widespread commercial acceptance.

The acoustic output is limited by the power available to drive the electro-acoustic transducer. Pingers are battery-powered devices. Because of the difficulty of changing the batteries and resealing the watertight housing, it is desirable to drive the transducer with as little average power as possible while still providing an adequate acoustic output to perform the warning function. Driving the transducer with as little average power as possible maximizes the battery lifetime.

In related prior art, a patent issued to Fuentes et al (U.S. Pat. No. 4,805,339) describes a fish lure with a sound transmitter and a means for increasing the sonic output into the water. In this case the means for increasing the sonic output is a fluid coupling of the sound transmitter to the lure housing. No effort was disclosed to create a resonant acoustic chamber. A patent issued to Zaccheo (U.S. Pat. No. 5,291,682) describes a fishing net system made species-selective by an underwater acoustic transmitter. No effort is disclosed to increase the sonic output. A patent issued to Parra (U.S. Pat. No. 5,134,592) describes an acoustic method for scaring dolphins away from tuna nets by transmitting acoustic recordings of killer whales. No acoustic enhancements are disclosed.

SUMMARY OF THE INVENTION

Any mechanical design feature which increases the acoustic output into the water for a given power input to the electro-acoustic transducer is valuable. This invention relates to a particular mechanical construction, developed as one part of a comprehensive program to optimize the underwater pinger operation, which maximizes the acoustic output into the water. The construction consists of a spacing introduced between the electro-acoustic transducer and the watertight pinger housing. The spacing is calculated to introduce an acoustic resonant condition for acoustic waves which travel between the transducer and the watertight housing. The construction is called an acoustic resonance chamber. This spacing also places the watertight housing at a node of maximum acoustic wave amplitude, thereby maximizing the coupling of the acoustic wave through the watertight housing and into the surrounding water. As a result of the comprehensive program to optimize the underwater pinger operation, operational battery lifetimes of six months have been demonstrated.

More particularly, the acoustic resonance chamber is an air-filled spacing between the mechanism which creates the acoustic waves (electro-acoustic transducer) and an acoustically-reflecting surface (a portion of the pinger housing). With a proper spacing between the transducer and the reflecting surface, the electro-acoustic transducer motion causing the direct acoustic wave is reinforced by the reflected acoustic wave which has been reflected back from the reflecting surface. The direct and reflected acoustic waves are in phase at the electro-acoustic transducer. This condition of acoustic resonance creates a higher-amplitude acoustic wave between the transducer and reflecting surface than would be the case without resonance. The spacing between the transducer and reflecting surface to create a resonant condition is calculated for a particular acoustic frequency. The resonant condition will exist for that frequency (to be called the acoustic wave fundamental frequency) and for all multiples of that frequency (called the acoustic wave harmonic frequencies). In a pinger the acoustic wave may be generated by an electronic oscillator which intentionally creates harmonics at 3, 5, 7, . . . times the fundamental frequency. Also the acoustically-reflecting surface is the watertight pinger housing having both a reflective and transmissive characteristic. It is desirable to couple as much of the sound as possible from inside the pinger (inside the acoustic resonance chamber) to the outside (in the water). Therefore a further requirement for the proper spacing between the electro-acoustic transducer and the acoustically-reflecting surface is that the reflecting surface be positioned at a point of maximum amplitude of the acoustic wave created by the electro-acoustic transducer.

These and other advantages of the present invention will become apparent upon review of the drawings, the detailed description, and the appended claims.

DETAILED DESCRIPTION OF THE PREFERRED EMBODIMENT OF THE INVENTION

Figure 1:
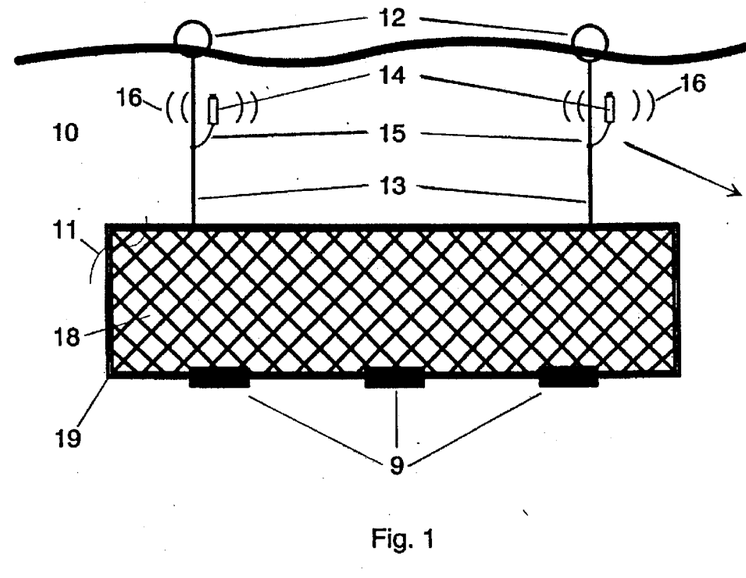
FIG. 1 and 1a show a typical installation of an underwater pinger on a fishing net, with detail of the pinger and attachment means.
Figure 1A:
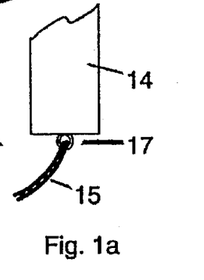

FIG. 1 shows a typical deployment of a fishing net 11 with attached underwater pingers 14. The pingers 14 are used to alert certain fish and marine mammals to the presence of the fishing net 11. The fishing net 11 consists of a regular pattern of fabric, cord, or string 18 suspended within a frame 19. The fishing net 11 is deployed in the water 10 with the goal of capturing targeted marine species (fish). The fishing net 11 being ballasted by weights 9 tends to sink but is suspended from floats or buoys 12 by halters 13. The figure shows one section of a fishing net 11. An actual deployment would typically use many attached sections to create a larger entrapment area. Underwater pinger 14 are attached to the halters 13 or elsewhere on the net 11 by an attachment means 15 which may typically be a short section of rope or a clip. FIG. 1a shows the underwater pinger 14 with the attachment means 15 connected at an attachment point 17 which is an integral part of a watertight pinger housing 20 to be described herein. The pingers 14 emit acoustic waves 16 into the surrounding water 10 to alert certain fish and marine mammals to the presence of the fishing net 11. The frequency of the acoustic wave 16 is chosen so that the non-targeted marine species are alerted, but the targeted fish are not alerted. The targeted fish are not alerted by the acoustic emissions 16 because they have little or no auditory response in the frequency range of the pinger acoustic emissions 16.

As indicated, FIG. 1 shows a typical fishing net surface deployment. A corresponding bottom deployment is also commonly used to catch ground-fish. In this case the net sinks to the bottom but is held open by floats. Other deployments and net configurations are used and all are candidates for the application of pingers 14.

Figure 2:
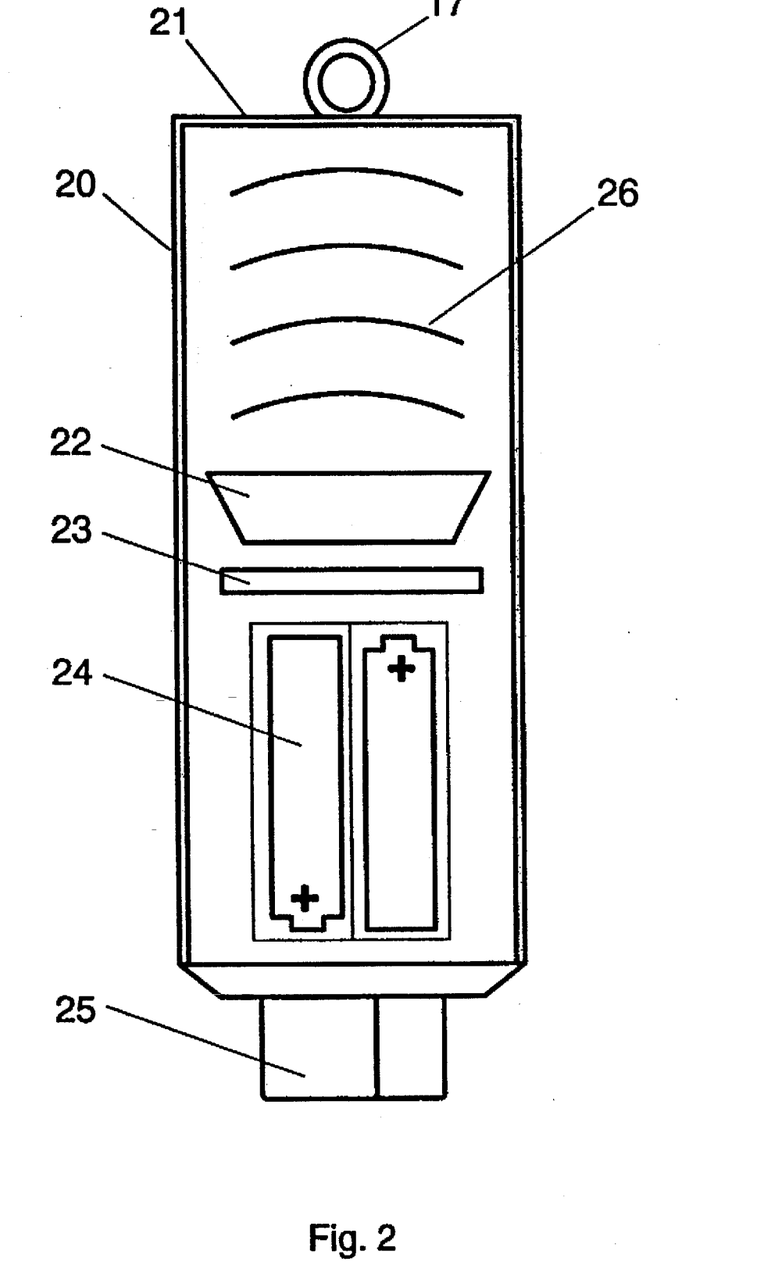
FIG. 2 shows a cross-section of the underwater pinger of the present invention.

FIG. 2 shows a cross-section of the underwater pinger 14. The pinger 14 is contained within the pinger housing 20 which includes the attachment point 17 used to attach the pinger 14 to the fishing net 11. A portion 21 of the pinger housing 20 is an acoustically-reflective surface 21 to an acoustic wave 26 generated by an electro-acoustic transducer 22. In the preferred embodiment, the electro-acoustic transducer 22 is a Murata-Erie PKM29-3A0 piezo-electric transducer with self-resonant frequency of approximately 3300 Hz, but other types and manufacturers' units will work similarly in the present invention. The electro-acoustic transducer 22 moves in response to electrical signals from an oscillator 23. The motion of the transducer 22 creates an acoustic wave 26. The oscillator 23 will normally cause the transducer 22 to oscillate in an intermittent manner rather than continuously, reducing the average power to drive the oscillator 23. The average power is reduced because the oscillator 23 consumes very little power when the transducer 22 is not being actively driven. A continuous oscillation of the transducer 22 could be employed at the expense of higher average power to drive the oscillator 23 and the transducer 22, but because of the higher average power consumption, this is not typically done. The acoustic wave 26 is intermittent but still provides an adequate protective stimulus for the subject marine species. Power is delivered to the oscillator 23 from battery means such as a battery pack 24 which may consist of one or more primary or rechargeable cells. A removable plug 25 is provided for periodic replacement of one or more batteries of the battery pack 24 or for service of the pinger 14. The plug 25 is sealed against the pinger housing 20 to maintain the watertight characteristic of the pinger housing 20. The portion 21 of the pinger housing 20 not only provides the acoustically-reflective surface 21 necessary to create the acoustic resonance condition, but it couples the acoustic wave 26 to the surrounding water 10 through its own acoustic transmissive characteristic.

Figure 3A:
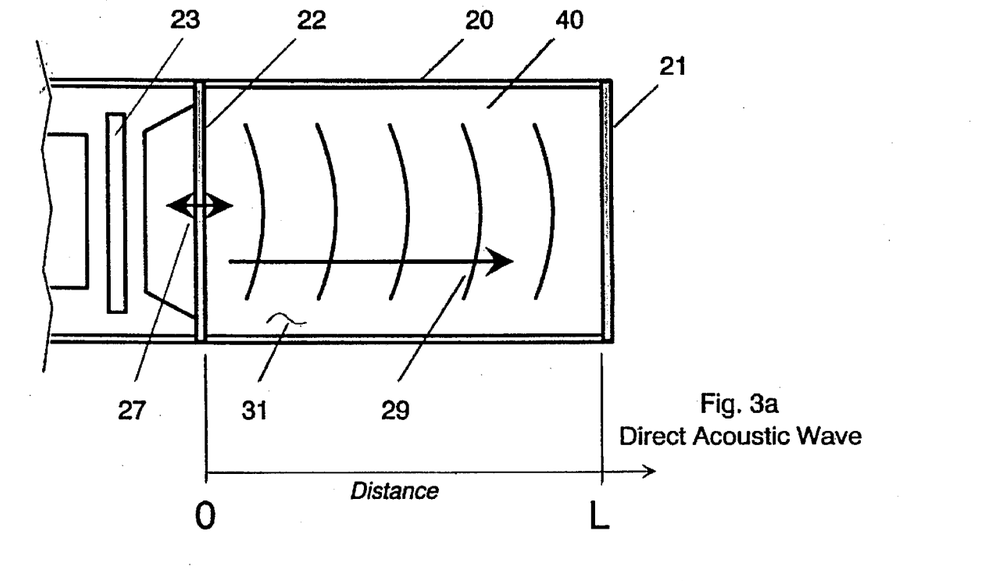
FIGS. 3a and 3b depict the operation of the acoustic resonance chamber.
Figure 3B:
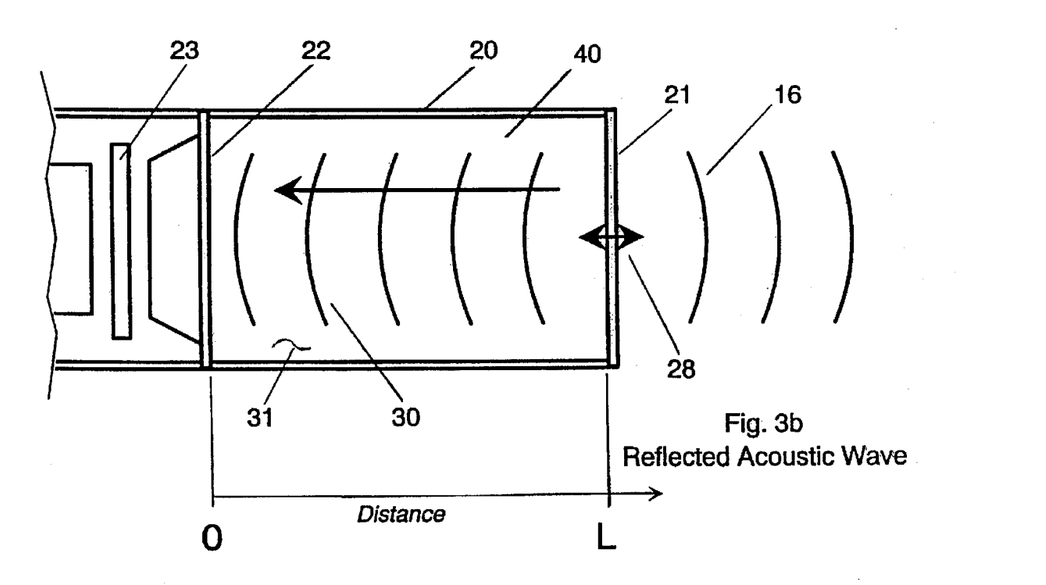

FIGS. 3a and 3b depict the operation of an acoustic resonance chamber 40 within the pinger housing 20, and which includes the electro-acoustic transducer 22 and an air-filled space 31. Outside the housing 20 is the surrounding water 10. The acoustically-reflective surface 21 couples a portion of a direct acoustic wave 29 to the surrounding water 10 as the acoustic emission 16. The electro-acoustic transducer 22 is caused to oscillate by the electronic oscillator 23 with a deflection 27. The deflection 27 of the electro-acoustic transducer 22 creates the direct acoustic wave 29 which travels through the space 31 toward the reflective surface 21. A portion of the direct acoustic wave 29 is reflected back as reflected acoustic wave 30. A portion of the energy in the direct acoustic wave 29 causes a deflection 28 in the reflective surface 21 and creates the acoustic transmission 16 in the surrounding water 10. The transmission 16 is the acoustic wave which provides the protective function to the marine species. By placing proper spacing between the electro-acoustic transducer 22 and the reflecting surface 21, the reflected acoustic wave 30 tends to cause a deflection of the electro-acoustic transducer 22 in the same direction as the transducer 22 is being driven by the oscillator 23. The direct acoustic wave 29 and the reflected acoustic wave 30 are in phase at the transducer location, creating a resonance condition. The proper spacing is calculated to create a resonance condition for the fundamental frequency of the acoustic emission and will create a resonance for all harmonics (multiples) of the fundamental.

Consider the electro-acoustic transducer 22 oscillating at a frequency F. The transducer 22 is spaced from the acoustically-reflective surface 21 by a distance L. The transducer 22 causes the direct acoustic wave 29 to travel to the reflecting surface 21. At that point the acoustic wave 30 is reflected back to the transducer 22. If the distance L is properly chosen in consideration of the wavelength of the acoustic wave in the transmission medium between the transducer 22 and the reflective surface 21, the reflected wave 30 will reinforce the oscillation of the transducer 22. The electro-acoustic system will be in resonance. The wavelength of the acoustic wave is governed by Equation 1:

$$W = K/F \quad \text{(Equation 1)},$$

where:

W=wavelength of the acoustic wave (m)
K=speed of sound in the transmission medium (m/s)
F=frequency of the acoustic wave (1/s).

In the present application the transmission medium is air, with a speed of sound at standard conditions of 331.6 m/s.

The total path length of the acoustic wave from the transducer 22 to the reflective surface 21 and back to the transducer 22 is 2 times L. If the total path length 2 L is equal to a multiple of the acoustic wavelength W the resonant condition is maximized. Successful resonance does not require the path length to be exactly a multiple of the acoustic wavelength, but only that it be within (plus or minus) one quarter wavelength (90 degrees) of an integral multiple. In this range the reflected wave 30 has a component that is in phase with the direct wave. If the acoustically-reflective surface 21 is spaced away from the electro-acoustic transducer 22 by an integral multiple of one-half of the wavelength of the acoustic wave, the pinger housing 20 is at a node of maximum acoustic wave amplitude. In this case the acoustic wave is maximally coupled and transmitted into the surrounding water 10. Note that the electro-acoustic transducer 22 is the source for the direct acoustic wave 29 and so is always a location of maximum acoustic wave amplitude. Also note that the electro-acoustic transducer 22 may itself have resonant characteristics. The resonance characteristic of the transducer 22 may be exploited by choosing the fundamental pinger frequency to be at the resonant frequency of the electro-acoustic transducer 22. This frequency selection is subject to consideration of the acoustic response of the subject marine species and the impact of the frequency selected on the size of the acoustic resonance chamber 40 (and hence the overall pinger size). The condition for the pinger housing 20 being at a node of maximum acoustic wave amplitude is consistent with the condition for acoustic resonance when the spacing L is a multiple of the acoustic wave half-wavelength.

Figure 4A:
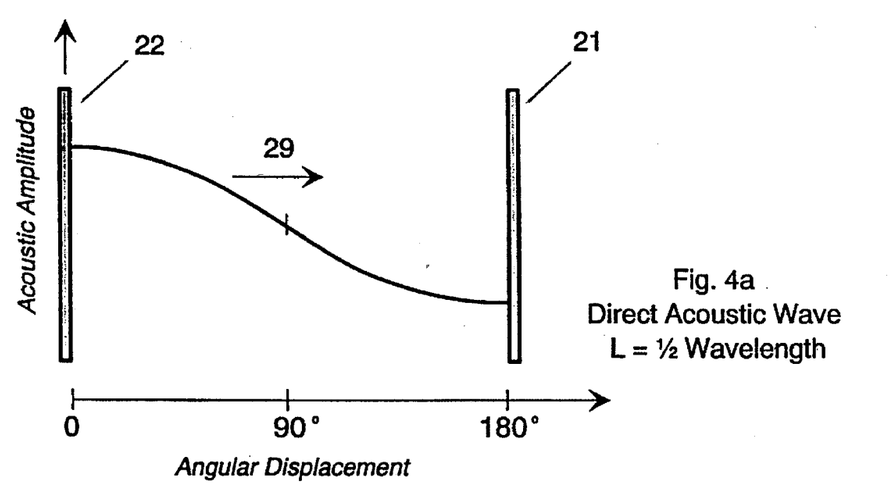
FIGS. 4a and 4b show the details of the direct and reflected acoustic waves, respectively, within the acoustic resonance chamber for the case where the distance between the electro-acoustic transducer and pinger housing is equal to one-half wavelength of the acoustic wave.
Figure 4B:
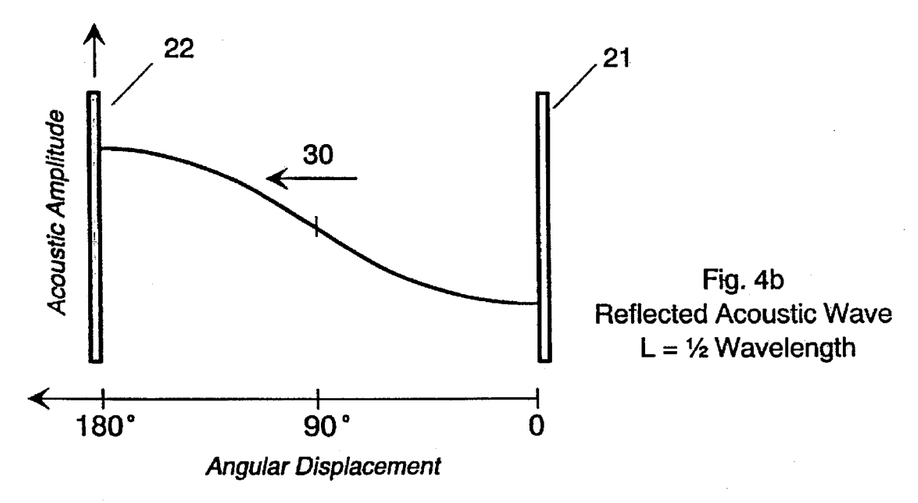

FIGS. 4a and 4b show the direct acoustic wave 29 and the reflected acoustic wave 30 plotted as acoustic amplitude versus angular displacement for the case where the distance L between the electro-acoustic transducer 22 and the reflective surface 21 is 180 degrees or one-half wavelength. FIG. 4a shows the direct wave 29 and FIG. 4b shows the reflected wave 30. For the dimensions shown the reflected wave 30 is exactly in phase with the direct wave 29 at the electro-acoustic transducer 22 location. This is the condition of maximum reinforcement of the acoustic wave, or maximum resonance. Note that the reflective surface 21 is at a point of maximum acoustic wave amplitude. One can easily see that the resonant condition would still exist if the total path length traveled by the direct wave 29 plus reflected wave 30 differed from the ideal shown by as much as ±90 degrees. At a total path length of either 270 degrees or 450 degrees the reflected wave 30 is orthogonal to the direct wave 29 (has no component in phase with the direct wave 29), and neither reinforces nor opposes it.

Figure 5A:
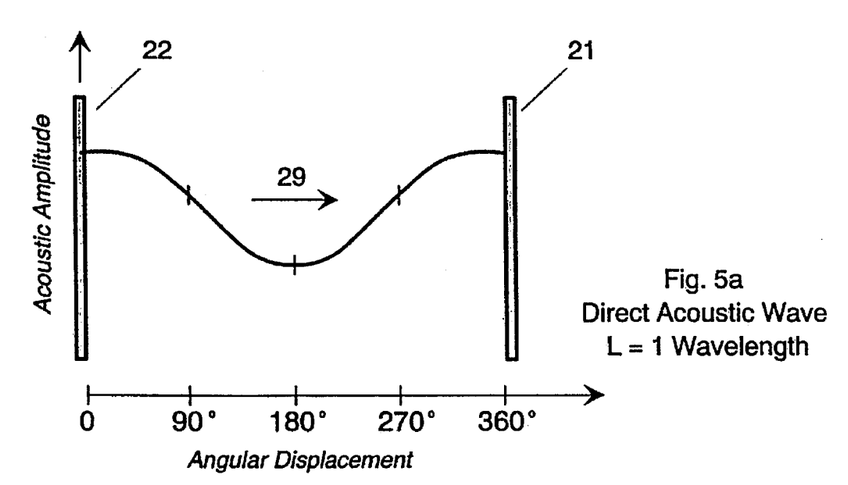
FIG. 5a and 5b show the details of the details of the direct and reflected acoustic waves, repectively, within the acoustic resonance chamber for the case where the distance between the electro-acoustic transducer and pinger housing is equal to one wavelength of the acoustic wave.
Figure 5B:
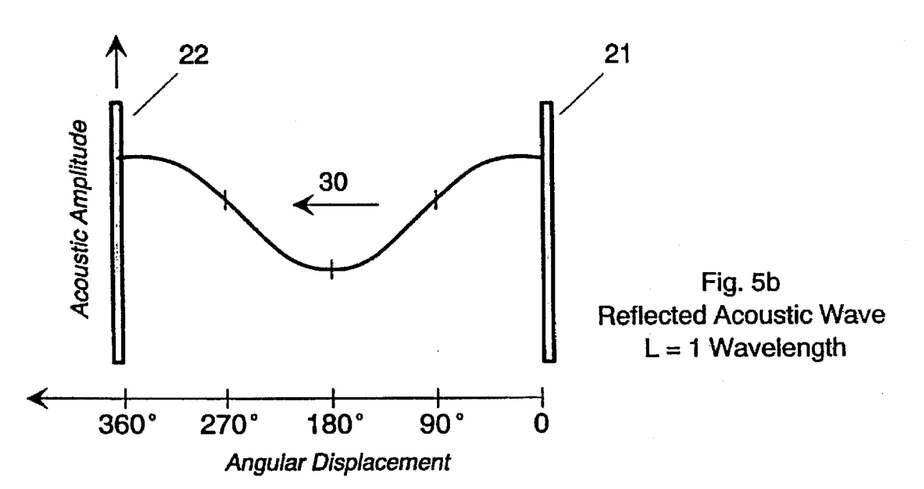

FIGS. 5a and 5b show the direct acoustic wave 29 and the reflected acoustic wave 30 plotted as acoustic amplitude versus angular displacement for the case where the distance L between the electro-acoustic transducer 22 and the reflective surface 21 is 360 degrees or one wavelength. Again the reflected wave 30 is exactly in phase with the direct wave 29 at the location of the electro-acoustic transducer 22. Again the resonance condition exists at the ideal spacing shown and for a total path length which may vary from the ideal by as much as ±90 degrees. Again the reflective surface 21 is at a point of maximum acoustic wave amplitude.

The condition for maximum resonance can be generalized to the total path length (total distance traveled by the direct wave 29 plus the reflected wave 30, which is twice the distance between the electro-acoustic transducer 22 and the reflective surface 21 of the pinger housing 20) being equal to a multiple of the wavelength. The condition for resonance is generalized to that for maximum resonance plus or minus 0 to 90 degrees. The first few resonant ranges are listed in Table 1 along with the points of maximum resonance. Resonance is achieved for a Total Path Length of:

270 deg to 450 deg with maximum resonance at 360 deg 630 deg to 810 deg with maximum resonance at 720 deg 990 deg to 1170 deg with maximum resonance at 1080 deg 1350 deg to 1530 deg with maximum resonance at 1440 deg 1710 deg to 1890 deg with maximum resonance at 1800 deg 2070 deg to 2250 deg with maximum resonance at 2160 deg (Dependence of Resonance on Total Acoustic Wave Path Length)

Table 1

Figure 6:
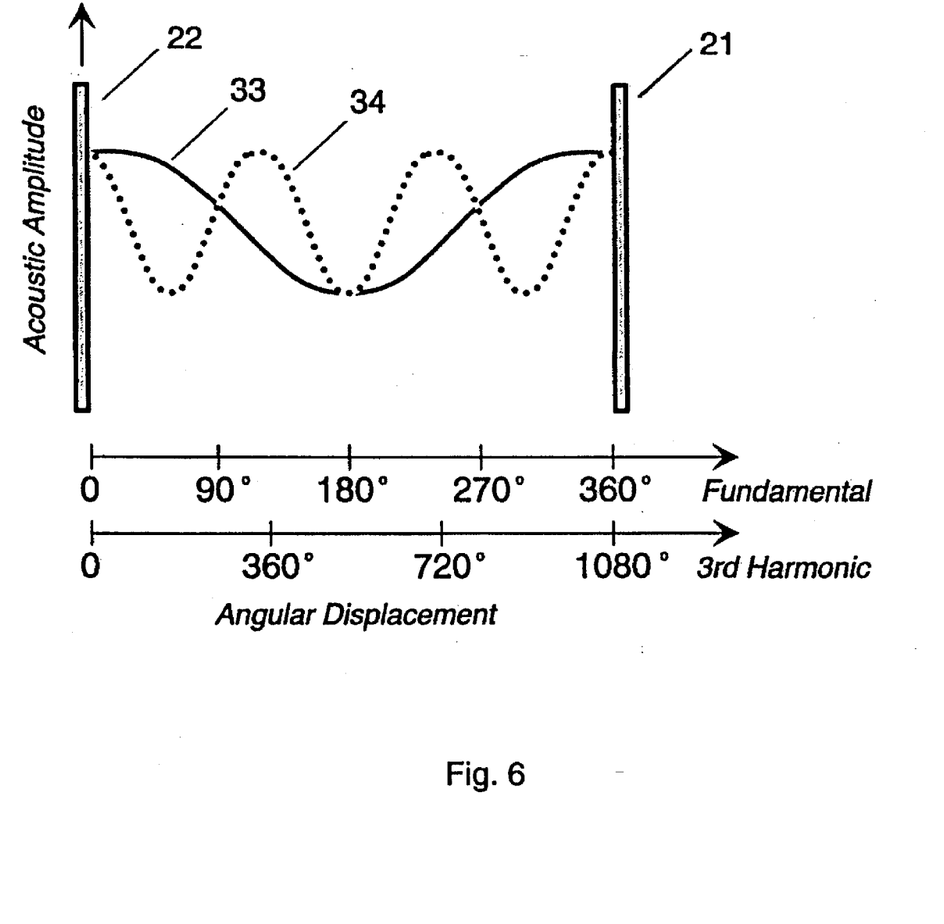
FIG. 6 shows the operation of the acoustic resonance chamber for a fundamental acoustic wave and its third harmonic.

FIG. 6 shows the acoustic amplitude versus angular displacement for the situation where the direct wave 29 consists of a fundamental wave 33 and a third harmonic 34 and where the distance L is equal to one wavelength of the fundamental wave 33. The angular displacement is shown for both the fundamental wave 33 and the third harmonic 34. The total path length is two times 360 or 720 degrees for the fundamental 33 and two times 1080 or 2160 degrees for the third harmonic 34. It is clear that both the fundamental wave 33 and third harmonic 34 are in resonance according to the listing of resonant ranges above. This can be easily generalized to state that a condition of maximum resonance at any acoustic wave frequency guarantees a condition of maximum resonance at any multiple of that frequency.

To calculate the dimensions for the acoustic resonance chamber 40, consider the case for an acoustic wave with frequency 3300 Hz. The speed of sound in air at standard temperature and pressure is 331.6 m/s. The wavelength of the acoustic wave is calculated according to:

$$\text{Wavelength} = (331.6 \text{ m/s})/(3300 \text{ cycles/s}) = 0.10 \text{ m } (3.94 \text{ in}).$$

The maximum resonance will occur for the total path length of 0.10 m, 0.20 m, 0.30 m, and so on. Further, resonance will occur for a total path length of 0.075 to 0.125 m, 0.175 to 0.225 m, 0.275 to 0.325 m, and so on. The condition for maximum acoustic wave amplitude at the reflective surface 21 is also fulfilled by the above total path lengths. So a spacing between the electro-acoustic transducer 22 and the reflective surface 21 of 0.05 m (1.97 in) creates a condition of maximum resonance and maximum acoustic wave amplitude at the reflective surface 21 for an acoustic wave at 3300 Hz.

The oscillator 23 drives the electro-acoustic transducer 22 with a square wave which is composed of the fundamental wave 33 and all odd harmonics at amplitudes relative to the fundamental amplitude of the reciprocal of the harmonic number. So the wave consists of the fundamental wave 33, a third harmonic 34 at one-third the amplitude of the fundamental, a fifth harmonic at one-fifth the amplitude of the fundamental, and so on. It is desirable to establish a resonant condition not only for the fundamental wave 33, but also for the harmonics. Because of the diminishing amplitude with harmonic number, the most important harmonics for the pinger 14 application are the third and fifth. If the fundamental acoustic wave frequency is 3300 Hz, the third harmonic 34 is at 9900 Hz (with a wavelength of 0.033 m) and the fifth harmonic is at 16,500 Hz (with a wavelength of 0.02 m). Following the same calculations as was done above for the 3300 Hz fundamental 33, resonance at 9900 Hz will occur for a total path length of 0.033, 0.067, 0.10 m, and so on. Resonance will occur for a total path length of 0.025 to 0.041 m, 0.058 to 0.075 m, 0.092 to 0.108 m, and so on. Note that a total path length of 0.10 m creates a condition of maximum resonance for the fundamental wave 33 and the third harmonic 34, and following the same reasoning will create a condition of maximum resonance for all higher order harmonics as well. Note that as the harmonic order goes up, the dimensional range for the resonance condition becomes smaller by a factor of the harmonic number, because the wavelength is reduced by the same factor.

The described mechanical construction uses the air in the space 31 inside the pinger housing 20 to couple the electro-acoustic transducer 22 to the reflective surface 21. The direct acoustic wave 29 travels through the air and hits the reflective surface 21. A portion of the direct acoustic wave 29 is reflected back as a reflected acoustic wave 30, and a portion is transmitted into the reflective surface 21. The acoustic wave within the housing 20 is partially reflected at the housing-to-water interface and partially transmitted into the surrounding water 10. The percentage of the direct wave 29 that is reflected at a boundary is related to the difference in the acoustic impedances for the two materials. The units of acoustic impedance are kilograms per second per meter-squared. For the preferred embodiment the pinger housing 20 is made of Noryl plastic, a trademark product of General Electric Co. The acoustic impedances involved for the underwater pinger 14 are: air at 400 kg/sm$^2$, Noryl plastic at 2,000,000 kg/sm$^2$ and seawater at 1,500,000 kg/sm$^2$. One skilled in the arts will readily determine that the direct acoustic wave 29 from the electro-acoustic transducer 22 is predominantly reflected back from the reflective surface 21 (over 99%). Because the reflected wave 30 is so strong relative to the direct wave 29, the resonant action provided by the acoustic resonance chamber 40 is key to optimized acoustic performance. The acoustic wave within the pinger housing 20 is only 20% reflected at the pinger-water interface, so the acoustic wave that penetrates the pinger housing 20 passes into the surrounding water 10 with little attenuation.

While the present invention has been described with reference to particular example embodiments, it is to be understood that all modifications and equivalents fall within the scope of the following claims.

I claim:

1. An apparatus for alerting marine creatures to the existence of a structure located in water comprising:
   a. transducer means for creating and transmitting an acoustic wave;
   b. a housing for containing said transducer means and a self-contained power source, said housing including an amplitude-enhancing section; and
   c. an end means of said amplitude-enhancing section for both reflecting and transmitting said acoustic wave, said end means spaced from said transducer means so as to enhance an amplitude of said acoustic wave by reflection of said acoustic wave and providing a point of transmission of said acoustic wave to said water.

2. The apparatus as claimed in claim 1 with said housing further comprising a coupling section spaced from said transducer means so as to enhance coupling of said acoustic wave to said water by acoustic transmission through said coupling section.

3. The apparatus as claimed in claim 1 wherein said end means is an acoustically reflective surface located at an end of said housing that is opposite said transducer means, where said end means is also deflectable so as to emit said acoustic wave therefrom.

4. The apparatus as claimed in claim 1 wherein said acoustic wave includes an acoustic wavelength and wherein said end means of said amplitude-enhancing section is spaced from said transducer means at a distance equal to $\{(M/2)\pm(0 \text{ to } \frac{1}{8})\}$ times said acoustic wavelength where M is a non-zero integer.

5. The apparatus as claimed in claim 1 wherein said acoustic wave has an acoustic wavelength and wherein said end means of said amplitude-enhancing section is spaced from said transducer means at a distance equivalent to about one-half of said wavelength.

6. The apparatus as claimed in claim 5 wherein a gap between said transducer means and said amplitude-enhancing section is air-filled, wherein the length of said acoustic wavelength is dependent upon the speed of sound through said air-filled gap and frequency of said acoustic wave, and wherein said frequency is 3300 Hz and said distance between said transducer means and said end means of said amplitude-enhancing section is 0.05 meters.

7. The apparatus as claimed in claim 6 wherein said amplitude-enhancing section is plastic.

8. The apparatus as claimed in claim 2 wherein said acoustic wave includes an acoustic wavelength and wherein said coupling section is spaced from said transducer means at a distance equal to $\{(M/2)\pm(0 \text{ to } \frac{1}{8})\}$ times said acoustic wavelength where M is a non-zero integer.

9. The apparatus as claimed in claim 2 wherein said acoustic wave has an acoustic wavelength and wherein said coupling section is spaced from said transducer means at a distance equivalent to about one-half of said wavelength.

10. The apparatus as claimed in claim 9 wherein a gap between said transducer means and said coupling section is air-filled, wherein the length of said acoustic wavelength is dependent upon the speed of sound through said air-filled gap and frequency of said acoustic wave, and wherein said frequency is 3300 Hz and said distance between said transducer means and said coupling section is about 0.05 meters.

11. An apparatus for alerting marine creatures to the existence of a structure located in water comprising:
   a. an electro-acoustic transducer designed to transmit an acoustic wave through an air-filled gap at a selected frequency; and
   b. a water-tight housing containing an electro-acoustic transducer, a self-contained power source, and an acoustically-reflective surface wherein a distance between said acoustically-reflective surface and said transducer is equivalent to about one-half of a wavelength of said acoustic wave, said acoustically-reflective surface being deflectable so as to partially reflect and partially transmit said acoustic wave and thereby provide a point of transmission of said acoustic wave to said water.

12. A method for alerting marine creatures to the existence of a structure located in water comprising the steps of:

a. creating an acoustic wave with a transducer means that includes a self-contained power source;

b. transmitting said acoustic wave from said transducer means;

c. spatially positioning said transducer means from an amplitude-enhancing section within a housing so as to enhance an amplitude of said acoustic wave by reflection of said acoustic wave;

d. partially reflecting said acoustic wave by an end portion of said amplitude-enhancing section so as to create an acoustic resonance condition within said amplitude-enhancing section; and e. partially transmitting said acoustic wave to said water by said end portion.

13. The method as claimed in claim 12 further comprising the step of spatially positioning said transducer means from a coupling section within a housing so as to enhance coupling of said acoustic wave to said water by acoustic transmission through said coupling section.

14. The method as claimed in claim 13 further comprising the step of spatially positioning said end portion of said amplitude-enhancing section from said transducer means at a distance equal to $\{(M/2)\pm(0 \text{ to } 1/8)\}$ times the wavelength of said acoustic wave where M is a non-zero integer.

15. The method as claimed in claim 13 further comprising the step of spatially positioning said end portion of said amplitude-enhancing section from said transducer means at a distance equivalent to about one-half of said wavelength.

16. The apparatus as claimed in claim 11 wherein said acoustically reflective surface is located at an end of said housing that is opposite said transducer means so as to emit said acoustic wave therefrom.

* * * * *